United States Patent [19]
Liu

[11] Patent Number: 5,850,873
[45] Date of Patent: Dec. 22, 1998

[54] METHOD FOR REDUCING VAPOR GENERATION IN A TEMPERATURE CONTROLLED LIQUID HOLDING TANK

[75] Inventor: Alex Baoda Liu, Novi, Mich.

[73] Assignee: Ford Global Technologies, Inc., Dearborn, Mich.

[21] Appl. No.: 722,333

[22] Filed: Sep. 27, 1996

[51] Int. Cl.[6] .............................. F25B 29/00; F28F 1/00
[52] U.S. Cl. ..................... 165/255; 165/48.1; 165/41; 123/41.12; 236/13; 219/497
[58] Field of Search .................... 123/41.12; 236/13; 165/48.1, 41

[56] References Cited

U.S. PATENT DOCUMENTS

| | | | |
|---|---|---|---|
| 4,362,924 | 12/1982 | Story | 219/497 |
| 4,689,967 | 9/1987 | Han et al. | 62/201 |
| 4,775,941 | 10/1988 | Gardner et al. | 364/473 |
| 5,053,605 | 10/1991 | Thorax | 219/501 |
| 5,369,976 | 12/1994 | Ratton | 73/23.2 |
| 5,441,099 | 8/1995 | Yasso | 165/41 |
| 5,526,675 | 6/1996 | Ratton | 73/23.2 |

OTHER PUBLICATIONS

Environmental Protection Agency, Part III, Federal Register, Wednesday, Aug. 23, 1995, vol. 60, No. 163, pp. 43880–43907.

Primary Examiner—Ira S. Lazarus
Assistant Examiner—Matthew Pryor
Attorney, Agent, or Firm—Gregory P. Brown

[57] ABSTRACT

A method is provided for reducing vapor generation in a temperature controlled fuel tank in a motor vehicle. The method cooperates with an apparatus having hot and cold fluid sources (20, 22), a heat exchanger (18) having hot and cold valves (26, 24) and an air blower (28) to force temperature conditioned discharge air flow onto a fuel tank (12). The method involves comparing actual and desired fuel temperature signals and producing a first error signal from the comparison. The method then produces a gain signal in response to an operating mode signal and the error signal. A first control signal is then generated in response to the first error signal representing the difference between a desired fuel temperature and the actual fuel temperature. Finally, the heat exchanger is actuated by supplying the first control signal to the cold and hot valves.

6 Claims, 2 Drawing Sheets

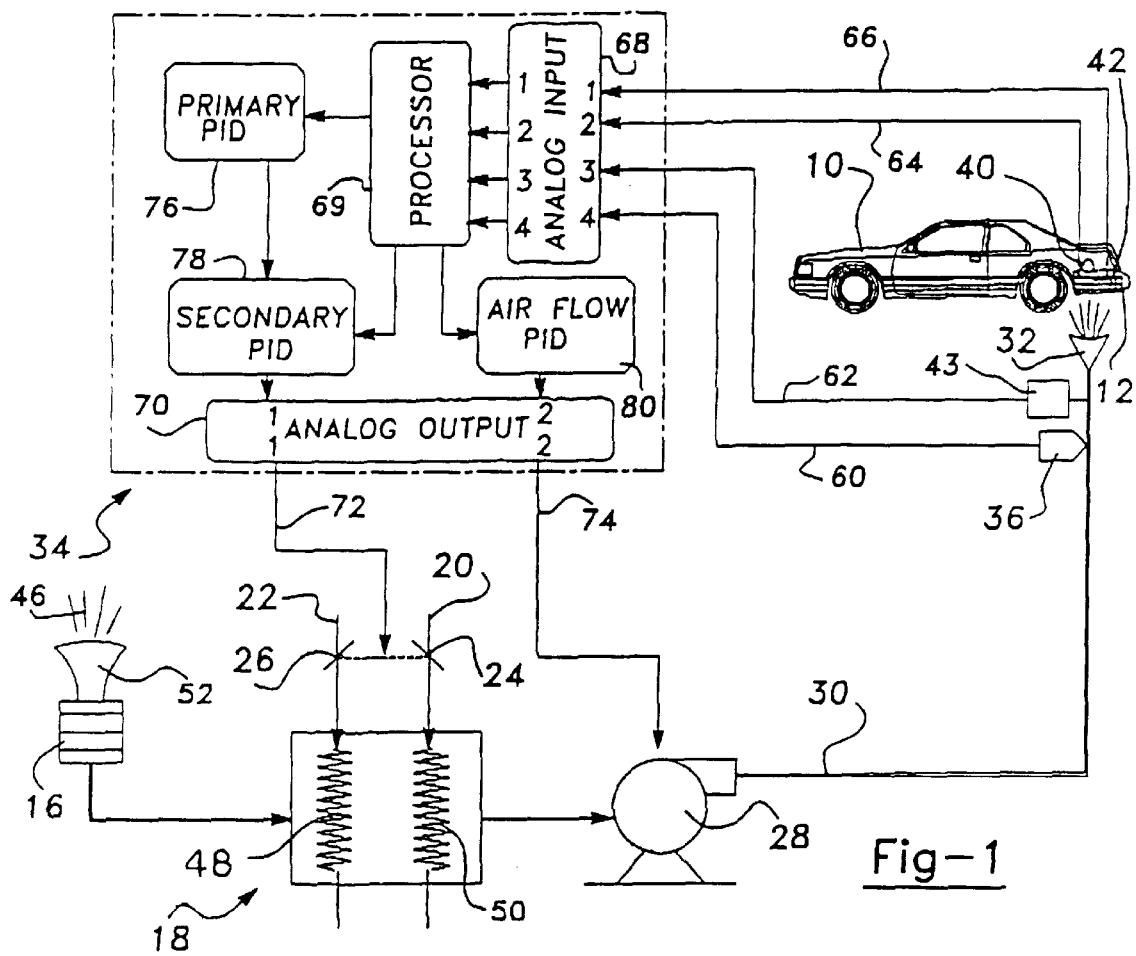
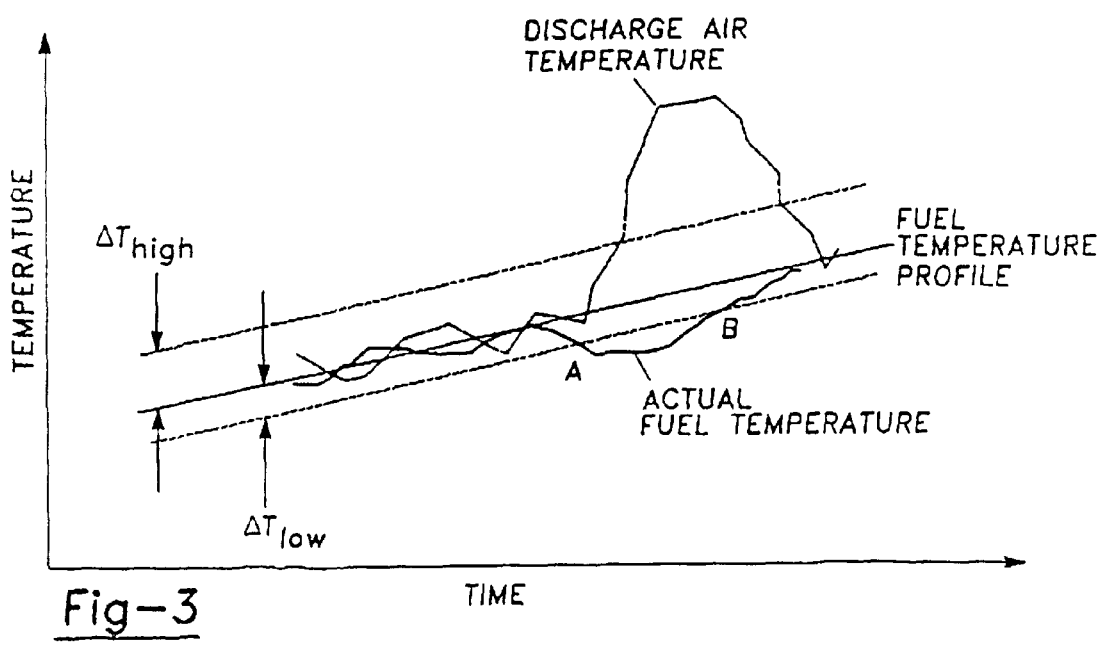
Fig-1
Fig-3

METHOD FOR REDUCING VAPOR GENERATION IN A TEMPERATURE CONTROLLED LIQUID HOLDING TANK

1. FIELD OF THE INVENTION

This invention relates generally to emission testing of an automotive vehicle. More particularly, the present invention relates to a method for reducing vapor generation in a temperature controlled liquid holding tank, such as a fuel tank in a motor vehicle during a running loss evaporation fuel emissions test.

2. DISCLOSURE INFORMATION

Vehicle running loss testing is required by the Enhanced Evaporative Emissions regulations as administered by both Environmental Protection Agency (EPA) and California Air Resources Board (CARB). This test measures the possible hydrocarbon emissions from vehicle fuel system vents, such as fuel cap and canister vent, while driving the vehicle at elevated temperature conditions (95° F.–105° F). The temperature of the fuel contained in the vehicle fuel tank is one of the most important parameters that affect the vehicle vapor generation from the vehicle during the running loss test. In order to provide a consistent means of evaluating a vehicles running loss emissions, a simulation has been established that allows manufacturers and emissions regulators to evaluate a vehicles hydrocarbon emissions.

The simulation utilizes a fuel tank temperature profile established by recording the fuel temperature while driving a vehicle under hot weather conditions through a predetermined drive cycle. In the test laboratory, where running loss testing is performed, an apparatus must be provided to control the temperature of the fuel within the fuel tank. This is necessary because there is no radiant heat transfer from a hot road surface to the fuel tank and because there is no agitation of the fuel within the tank in the test cell as there would be during operation on a road. For repeatability reasons, the apparatus must also be capable of stabilizing the vehicle's fuel system to a predetermined temperature before beginning the running loss test. The EPA sets the temperature at 95° F. and CARB sets it at 105° F. An apparatus is thus required to provide temperature control of the fuel within the fuel tank during the running loss test.

The apparatus must be capable of maintaining the fuel temperature within ±3° F. of the temperature indicated in the predetermined fuel tank temperature profile. Additionally, the apparatus may not discharge air onto the fuel system having a temperature outside a predetermined range. The range for the EPA is 85° F.–160° F. and the range for CARB is 90° F.–160° F. Additionally, the air flow cannot exceed 4000 CFM and the fuel temperature ramp rate during fuel tank temperature stabilization cannot exceed 5° F./hour.

In addition to these requirements, it would be desirable to have a method that would reduce fuel tank temperature cyclings induced by the instability of the control system because it increases vapor generation beyond that which would be generated in the real world for which the test is simulating. Temperature cycling as used herein means fuel temperature fluctuations above a desired temperature.

SUMMARY OF THE INVENTION

According to the present invention, a method for reducing vapor generation in a temperature controlled fuel tank in a motor vehicle is provided. The method uses an apparatus having hot and cold fluid sources, a heat exchanger having hot and cold valves and an air blower to force temperature conditioned discharge air flow onto the fuel tank. The method comprises the following steps:

producing a signal representing an operating mode, the signal having a first state when indicating a first mode of operation and a second state when indicating a second mode of operation;

sensing a fuel temperature in the fuel tank and generating an actual fuel temperature signal;

producing a signal representing a desired fuel temperature;

comparing the actual and desired fuel temperature signals and producing a first error signal from the comparison;

producing a gain signal in response to the operating mode signal and the error signal;

producing a first control signal in response to the first error signal representing the different between the desired fuel temperature and the actual fuel temperature; and actuating the heat exchanger by supplying the first control signal to the cold and hot valves.

An advantage of this method for reducing vapor generation in a temperature controlled liquid holding tank is its ability to stabilize the fuel and vapor temperatures in a reasonable time without generating excessive fuel vapors due to cycling. Additionally, the system stabilizes the fuel tank without exposing a tank vapor space to severe temperature variations, as this space has a lower thermal inertia and can overshoot the desired stabilization temperature faster than the liquid fuel.

BRIEF DESCRIPTION OF THE DRAWINGS

FIG. 1 is a block diagram of an temperature control apparatus in accordance with the present invention.

FIG. 3 is a plot of temperature versus time illustrating operation accordance with the present invention.

DETAILED DESCRIPTION OF THE PREFERRED EMBODIMENT

Figure 2:
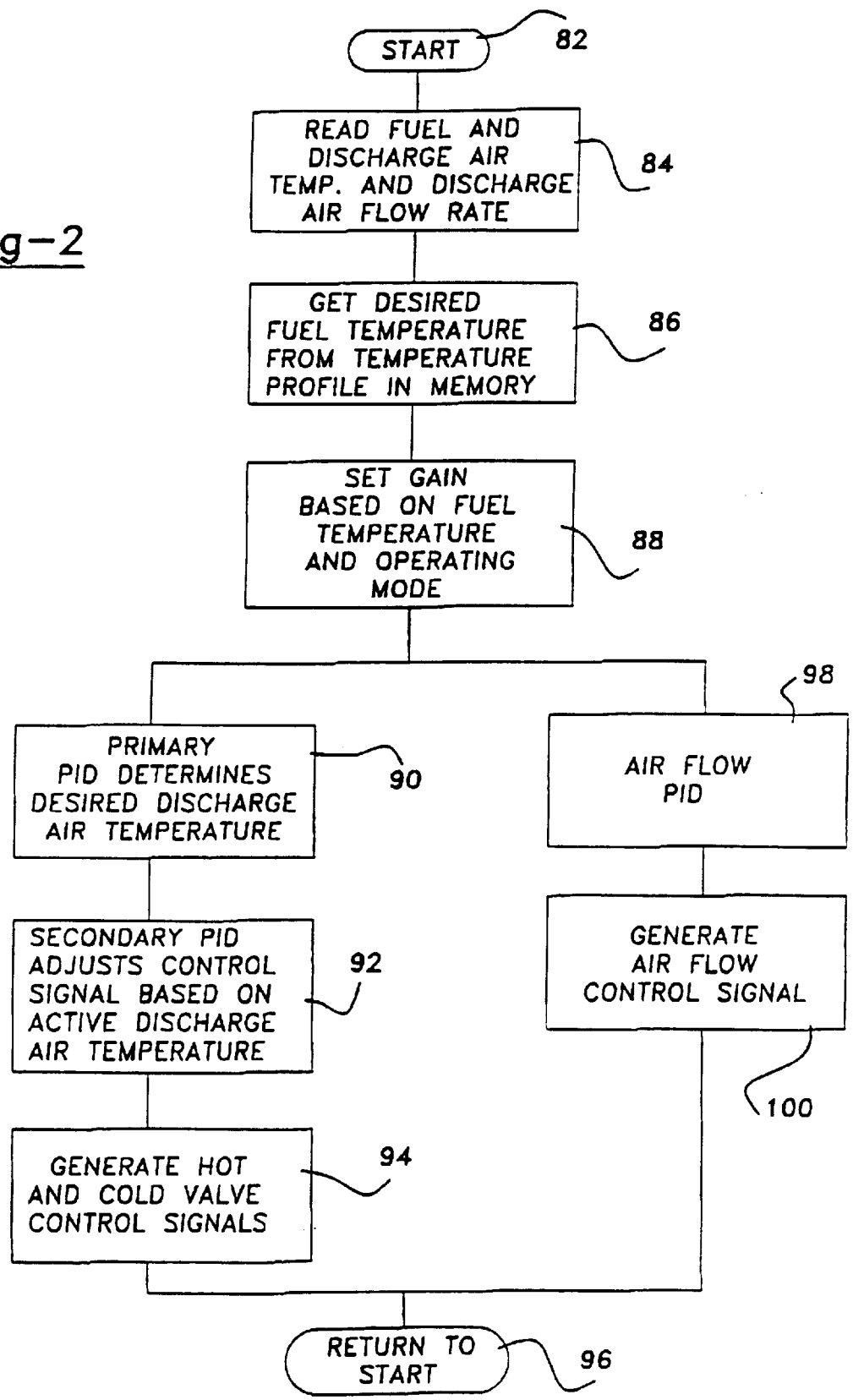
FIG. 2 is a logic flow block diagram according to the present invention.

Referring now to FIG. 1, an motor vehicle 10 includes a fuel tank 12 containing fuel in both liquid and gaseous states. The motor vehicle is located within a controlled laboratory setting having an ambient temperature generally controlled to approximately 75° F. To control the temperature of the liquid and vapor fuel a temperature control apparatus forcibly blows a stream of temperature conditioned air upon the bottom of the fuel tank 12.

The temperature control apparatus includes an inlet 14, an air filter 16, a heat exchanger 18, cold and hot fluid supplies, 20, 22 with cold and hot water valves 24, 26, an air blower 28, a duct 30 interconnecting and directing the air to an outlet 32. The temperature of the air and the air flow rate are controlled by a control unit 34, which receives input from thermocouples 40, 42 disposed in the fuel tank and an air flow sensor 36 and another thermocouple 43 disposed in the discharge air flow adjacent to the outlet 32. The temperature control apparatus is preferably contained in a single unit for ease of mobility in a test laboratory situation.

The heat exchanger 18 temperature conditions air drawn through it by the air blower 28. To maintain the efficiency of the heat exchanger 18, a conventional air filter 16 is provided to filter incoming air 46. The heat exchanger 18 preferably includes a heating portion 48 and a cooling portion 50.

The heat exchanger 18 receives cooling fluid from the cold fluid supply 20 and hot fluid supply 22 in quantities and proportions as dictated by the control unit 34. If the system requires greater heating capabilities, the heating portion of the heat exchanger may be adapted to accommodate steam. The preferred capacity for the heat exchanger should be capable of shifting the air temperature at a rate 20° F./min at 4000 cubic feet/minute. The capacity can be varied, however, these values were found to be sufficient to provide adequate temperature control for the variety of vehicles tested.

The control unit 34 communicates a control signal to the cold and hot valves 24, 26. The cold and hot valves adjust the flow of fluid into the heat exchanger 18 to condition the air flowing therethrough. The cold and hot valves 24, 26 may take any form of the many variable flow forms common in the industry. One such example would be separate solenoid actuated units, Model 870010 available from Honeywell Corporation. A pulse width modulated valve may also be used in lieu of the analog voltage operated solenoids described in the preferred embodiment. It should also be recognized that a mixing valve could be used to combine the cold and hot fluids and feed a single heat exchanger.

The air blower 28 forcibly draws the air to be temperature conditioned into the control apparatus at inlet 52. The duct 30 provides for sealed air communication from the inlet 52, through the air filter 16, into the heat exchanger 18 then past the air blower 28 and finally out the air outlet 32 which discharges the air onto the lower surface of the fuel tank within the motor vehicle. The air blower 28 is preferably of a variable speed having a capacity of 6000 cfm. The duct 30 may be of the flexible type to allow for easy positioning of the outlet relative to the various locations of the fuel tanks on different motor vehicles. The duct should have a sufficient diameter to accommodate the flow of air from blower 36 without creating significant head loss. For a 6000 cfm blower, a four foot by 2 foot rectangular duct is preferred.

The air outlet 32 can be one unit or several units depending on the size and number of the fuel tanks in the vehicle to be tested. The air outlet 32 may include rotatable vanes (not shown) which are movable so that air can be directed over the surface of a variety of tank shapes and configurations.

The air flow sensor 36 is disposed in the outlet 32 of the duct so as to measure the discharge air flow rate as it discharges onto the lower surface of the fuel tank. The air flow sensor 36 presently preferred is of the air velocity transducer design, such as the Model 8450 available from TSI, Inc. This provides a voltage representing the discharge air flow rate which is communicated to the control unit 34 via communication line 60.

The temperature control apparatus also includes several thermocouples. Specifically, a thermocouple 43 is located in the discharge air flow so as to generate a signal representing the discharge air flow temperature. This signal is communicated to the control unit 34 via communication line 62.

Additional thermocouples are located inside the fuel tank so as to generate a signals representing the fuel temperature. It is advantageous to use multiple thermocouples 40, 42 so as to allow an average fuel temperature calculation, since the agitation normally provided by movement of the vehicle is not present when the vehicle is operated on a chassis rolls dynamometer as it is during a running loss test. The signals are communicated from these thermocouples to the control unit 34 via communication lines 64, 66. The thermocouples in the fuel tank 40, 42 are of the commonly known K or J type and the thermocouple 43 in the discharge air flow is of the commonly known RTD type.

The control unit 34 includes an A-to-D converter 68 for converting the analog inputs from the various thermocouples and the air flow sensor 36. A processor 69 within the control unit 34 then performs various calculation using this information to generate various control signals which are output through a D-to-A converter 70 and communicated to the valves 24, 26 via communication line 72 and to the air blower 28 via communication line 74 for actuation in accordance therewith.

Those skilled in the art will appreciate in view of this disclosure that the processor 69 within the control unit 34 and its associated peripheral equipment could be structured according to several different architectures. In a preferred embodiment, however, the processor is configured so that a control program is sequentially read for each unit command from a read-only memory (ROM) which stores preset control programs and predetermined data tables, such as that representing a fuel temperature profile. Unit commands are executed by a central processing unit (CPU). The processor integrally includes an input-output control circuit (I/O) for exchanging data with the A-to-D and D-to-A converters 68, 70 and a random access memory (RAM) for temporarily holding data while the data are being processed.

The processor includes primary, secondary and air flow software implemented PID feedback compensators 76, 78 and 80, respectively. Each operate in a common way, with their individual parameters being varied to provide the desired compensation performance. As an example, the primary PID compensator as used to determine the desired discharge air temperature based on the difference between the actual fuel temperature and the desired fuel temperature takes the following form:

$$U_{fd}(K)=K_p U_{fd}(k)$$

$$U_{fd}=U_{fd}(k-1)+K_p[e(K)-e(k-1)]+K_i e(k)+K_d[e(k)-2e(k-1)+e(k-2)]$$

where Kc is the overall control gain, $e(k)=T_p(k)-T_f(k)$ is the fuel temperature error at sampling instant k, and k−1 refers to the immediately preceding sampling instant; k−2 is the sample that precedes the immediately preceding sampling; and $K_p$, $K_d$ and $K_i$ are proportional, derivative and integral gains, respectively. It should be noted that acceptable performance should also be achievable with PI control.

The desired fuel temperature is determined by referencing a predetermined fuel temperature profile stored in the ROM. This is essentially a time versus temperature data table, which prescribes the desired fuel temperature at any time during the test.

Turning now to FIG. 2, operation of the temperature control apparatus in accordance with the present invention will now be explained. At block 82 the processor starts the illustrated algorithm when the test operator selects either the stabilization mode or the running loss mode of operation.

The processor then moves to block 84 where the various sensors are read and their data input to the processor through the A-to-D converters. The processor then steps to block 86 where the processor sets the current desired fuel temperature signal ($T_p$) equal to either the stabilization temperature value or the value from the fuel temperature profile stored in ROM. The processor also generates a signal representing the operating mode, the signal having a first state to indicate stabilization operation and a second state to indicate running loss operation.

The processor then proceeds to block 88 to determine what overall control gain, ($K_c$), for the primary PID. The overall gain is set according to the following relationship:

$Kc=0.0$ if $(T_p-\Delta T_{low}) < T_f < (T_p+\Delta T_{high})$;

$Kc=0.5$ if $T_f \leq (T_p-\Delta T_{low})$, $T_f \geq (T_p+\Delta T_{high})$, and Operation mode = first state (stabilization);

$Kc=1.0$ if $T_f \leq (T_p-\Delta T_{low})$, $T_f \geq (T_p+\Delta T_{high})$, and Operation mode = second station (running loss).

Where ($T_f$) is the actual fuel temperature and ($T_d$) is desired temperature signal. $\Delta T_{low}$ and $\Delta T_{high}$ are predetermined parameters defining a deadband. As long as $T_f$ is within this deadband, the control system will not respond to drive a change in the discharge air temperature to deviate from the desired temperature signal, $T_{low}$. The deadband is a function of the thermal inertia of the vehicle fuel systems that will be tested. A properly established deadband will prevent non-representative fuel and vapor space temperature cycling and eliminate the need to adjust system gain to accomodate various vehicle designs. In the presently preferred embodiment, where it is desirable to maintain $T_f$ within $\pm 3°$ F. of $T_d$, $\Delta T_{low}$ and $\Delta T_{high}$ have been set to 0.5° F. and 0.8° F., respectively. From this, the processor then advances to block 90.

At block 90, the processor implements the primary PID compensator taking as input the overall system gain, $K_d$, and the error signal representing the difference in the desired fuel temperature and the actual fuel temperature. The output of the primary PID compensator is the desired discharge air temperature signal, $T_{dd}$. The processor proceeds to the secondary PID feedback compensator at block 92.

The processor communicates the desired discharge air temperature signal and an actual discharge air temperature signal ($T_{ad}$) to the secondary PID compensator in the form of a second error signal. The secondary PID compensator has a fixed overall gain, and implements the above described compensation algorithm in the same manner as the primary PID compensator. The output of the secondary PID compensator is the corrected desired discharge air temperature signal, $T_c$, also referred to herein as the first control signal. At block 94 the processor communicates the first control signal to the valve solenoid for actuation as required. At block 96 the processor returns to block 82 and repeats the described process.

If the temperature controlled apparatus employs a variable blower, the processor may also implement the air flow PID compensator 80 at block 98. The processor communicates the desired discharge air flow rate signal ($A_d$) from ROM and an actual discharge air flow rate signal ($A_d$) as measured by sensor 36 to the air flow PID compensator in the form of a third error signal. The air flow PID compensator 80 also has a fixed overall gain, and implements the above described compensation algorithm in the same manner as the primary PID compensator. The output of the air flow PID compensator is the corrected desired discharge air flow rate signal, $A_{cd}$, also referred to herein as the second control signal. At block 100 the processor communicates the second control signal to the air blower for actuation as required. At block 96 the processor returns to block 82 and repeats the described process.

Referring now to FIG. 3, understanding of the operation of the present invention will be aided through considering the illustrated temperature versus time plot. First, one should recognize the predetermined deadband defined by $\Delta T_{low}$ and $\Delta T_{high}$ spaced about the fuel temperature profile. Initially, for the time slice illustrated, the discharge air temperature is maintained substantially equal to the profile temperature, as no change in the actual fuel temperature is indicated. However, at point A, the actual fuel temperature falls outside of the deadband, thus requiring intervention. The discharge air temperature is increased to heat the fuel tank, and remains heated until the actual fuel temperature crosses back within the deadband at point B. Notice that the thermal inertial of the system continues to elevate the temperature of the fuel even after the discharge air temperature is reduced.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A method for reducing vapor generation in a temperature controlled fuel tank in a motor vehicle using an apparatus having a hot and cold fluid sources, a heat exchanger having hot and cold valves and an air blower to force temperature conditioned discharge air flow onto the fuel tank, comprising the steps of:

producing a signal representing an operating mode, said signal having a first state when indicating a first mode of operation and a second state when indicating a second mode of operation;

sensing a fuel temperature in the fuel tank and generating an actual fuel temperature signal;

producing a signal representing a desired fuel temperature;

comparing said actual and desired fuel temperature signals and producing a first error signal from said comparison;

producing a gain signal in response to said operating mode signal and said error signal;

producing a first control signal in response to said gain signal and said first error signal representing the difference between said desired fuel temperature and said actual fuel temperature; and actuating the heat exchanger by supplying said first control signal to the cold and hot valves.

2. The method according to claim 1, wherein said gain signal for said first operating mode is substantially half of said gain signal for said second operating mode.

3. The method according to claim 1, further comprising the steps of:

sensing a discharge air flow rate in said discharge air flow and generating an actual discharge air flow rate signal;

producing a signal representing a desired discharge air flow rate signal;

comparing said actual and desired discharge air flow rate signals and producing a second error signal from said comparison;

producing a second control signal in response to said second error signal representing the difference between said desired discharge air flow rate and said actual discharge air flow rate; and actuating the air blower at variable speeds based on said second control signal.

4. A method for reducing vapor generation in a temperature controlled fuel tank in a motor vehicle using an apparatus having hot and cold fluid sources, a heat exchanger having hot and cold valves and an air blower to force temperature conditioned discharge air flow onto the fuel tank, comprising the steps of:

producing a signal representing an operating mode, said signal having a first state when indicating a first mode of operation and a second state when indicating a second mode of operation;

sensing a fuel temperature in the fuel tank and generating an actual fuel temperature signal;

producing a signal representing a desired fuel temperature;

comparing said actual and desired fuel temperature signals and producing a first error signal from said comparison;

producing a gain signal in response to said operating mode signal and said error signal;

producing a desired discharge air temperature signal in response to said gain signal and said first error signal representing the difference between said desired fuel temperature and said actual fuel temperature;

sensing a discharge air temperature in said discharge air flow and generating an actual discharge air temperature signal;

comparing said actual and desired discharge air temperature signals and producing an second error signal from said comparison;

producing a first control signal in response to said second error signal representing the difference between said desired discharge air temperature and said actual discharge air temperature for producing a first control signal; and actuating the heat exchanger by supplying said first control signal to the cold and hot valves.

5. The method according to claim 4, wherein said gain signal for said first operating mode is substantially half of said gain signal for said second operating mode.

6. The method according to claim 4, further comprising the steps of:

sensing a discharge air flow rate in said discharge air flow and generating an actual discharge air flow rate signal;

producing a signal representing a desired discharge air flow rate signal;

comparing said actual and desired discharge air flow rate signals and producing a third error signal from said comparison;

producing a second control signal in response to said third error signal representing the difference between said desired discharge air flow rate and said actual discharge air flow rate; and actuating the air blower at variable speeds based on said second control signal.

* * * * *